Figure 5:
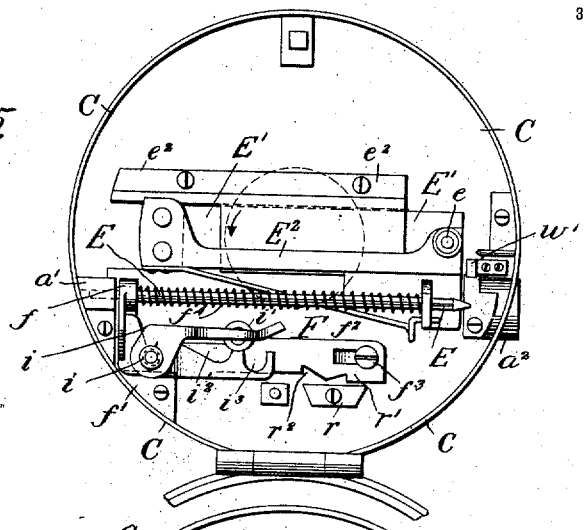

P. MOOSMANN.
WATCHMAN'S TIME DETECTOR.
APPLICATION FILED DEC. 4, 1907.
Reissued Feb. 7, 1911.
13,201.
3 SHEETS—SHEET 1.
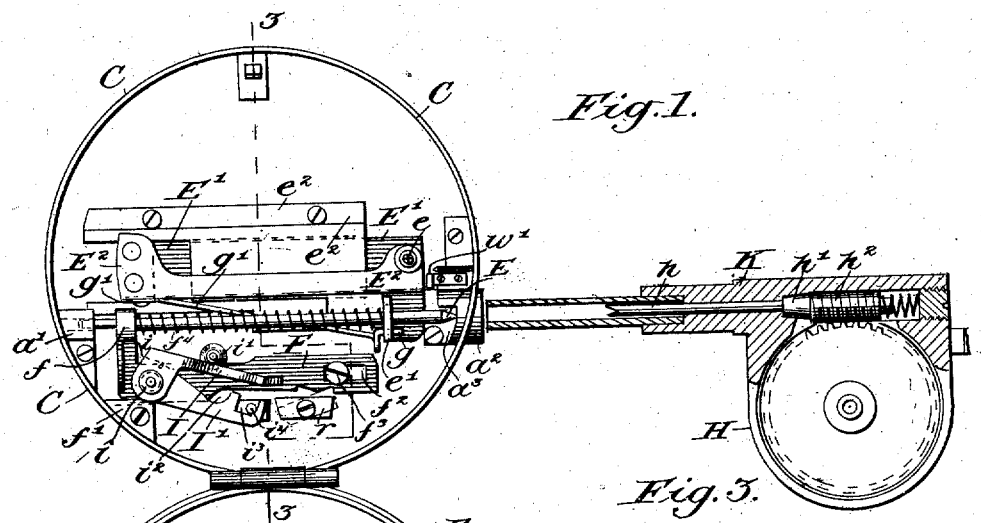
Fig. 1.
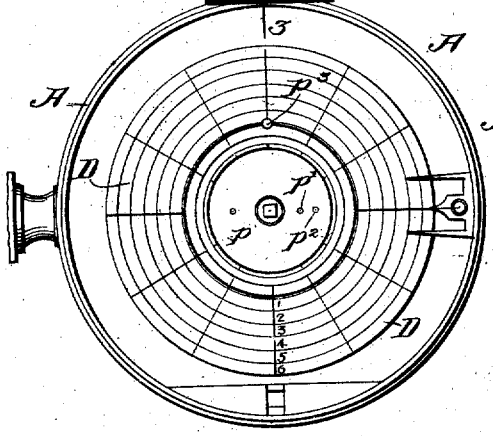
Fig. 3.
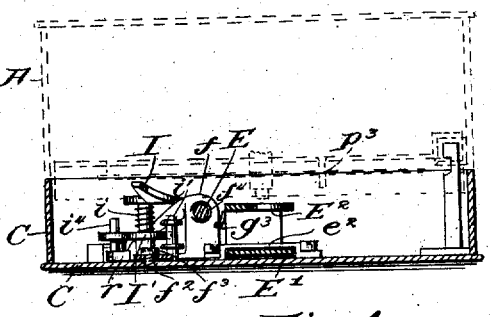
Fig. 4.
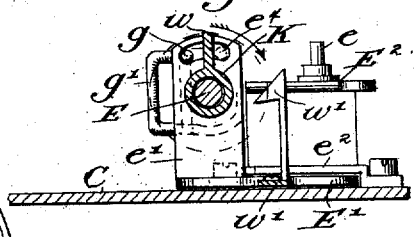
Fig. 2.
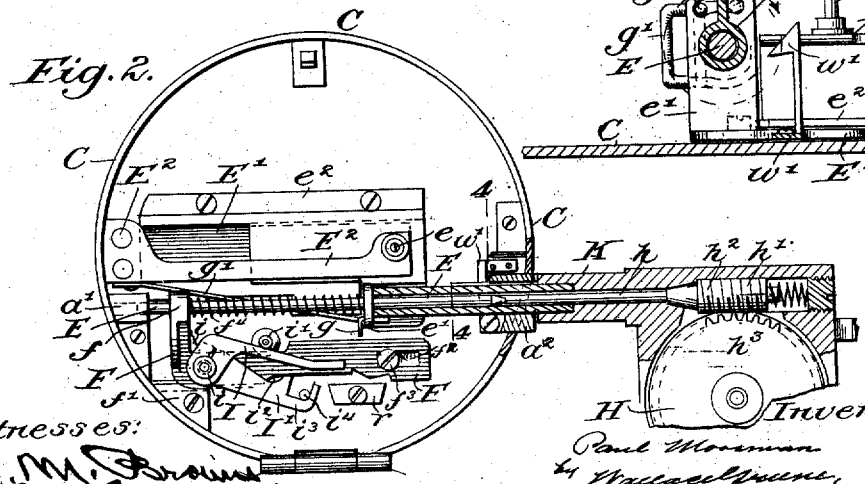
Witnesses:
D. M. Browne
R. Craig Greene
Inventor:
Paul Moosmann
by Wadsworth Greene, Atty.
THE NORRIS PETERS CO., WASHINGTON, D. C.

P. MOOSMANN.

WATCHMAN'S TIME DETECTOR.

APPLICATION FILED DEC. 4, 1907.

Reissued Feb. 7, 1911.

13,201.

3 SHEETS—SHEET 2.

Witnesses

Jos. F. Collins.

R. Craig Greene.

Inventor

Paul Moosmann by

Wallace Greene,

Attorney

THE NORRIS PETERS CO., WASHINGTON, D. C.

P. MOOSMANN.

WATCHMAN'S TIME DETECTOR.

APPLICATION FILED DEC. 4, 1907.

Reissued Feb. 7, 1911.

13,201.

3 SHEETS—SHEET 3.

Witnesses:
R. Craig Greene
Jos. F. Collins.

Inventor
Paul Moosmann
By his Attorney
Wallace Greene,

THE NORRIS PETERS CO., WASHINGTON, D. C.

UNITED STATES PATENT OFFICE.

PAUL MOOSMANN, OF NEW YORK, N. Y.

WATCHMAN'S TIME-DETECTOR.

13,201. Specification of Reissued Letters Patent. Reissued Feb. 7, 1911.

Original No. 806,166, dated December 5, 1905, Serial No. 235,768. Application for reissue filed December 4, 1907. Serial No. 405,136.

*To all whom it may concern:*

Be it known that I, PAUL MOOSMANN, a citizen of the Empire of Germany, residing in New York, borough of Brooklyn, in the State of New York, have invented certain new and useful Improvements in Watchmen's Time-Detectors, of which the following is a specification.

The objections to the well-known watchmen's time-detectors in which a clock-driven dial is used consist in the fact that in place of the keys for marking the dial, which keys are suspended at the different stations which the watchman has to visit on his regular rounds, imitation tools or simulating keys can be used for marking the dial, whereby the real object of the time-detectors is foiled and the regular and reliable supervision of the factory or other building rendered nugatory.

The object of this invention is to furnish an improved watchman's time-detector in which, in connection with suitable keys suspended at the different stations, a very reliable control is obtained, inasmuch as the marking of the time-dial cannot be accomplished by other devices, but only by the keys suspended from the stations to be visited on the regular rounds of the watchman; a further object is to provide marking means and to so arrange them that the use of a spurious or simulating key may be detected by the operation of the marking means; a further object is to provide a guard-device at one side of the spindle having its operative end capable of movement by the keys in respect to the spindle after a partial rotation of a key on the spindle, and a further object is to provide a clock in which an additional key control is provided which can be adjusted so as to operate the key-controllers or dispense with the operation of the same or produce an intermittent control of the same which is brought about by a movable key spindle for the engagement and non-engagement of the keys, not capable of movement by the keys at any point of the movement of the keys; and the invention consists of a watchman's time detector having a dial and keys, protecting means preventing access to the dial until removed by the key preparatory to the marking of the dial, and consists further of a marking means separate from the usual marking means adapted to mark the dial on the operation of any but the true key; and the invention consists further of a guard-device arranged at one side of the spindle having its operative end capable of movement by the keys in relation to the spindle after a partial rotation of a key on the spindle; and the invention consists further of a watchman's time detector having a movable spindle, but not capable of movement by the keys at any point of the movement of the keys, and a watchman's time-detector embodying the novel features and combinations of parts, which will be fully described hereinafter, and finally pointed out in the claims.

Figure 6:
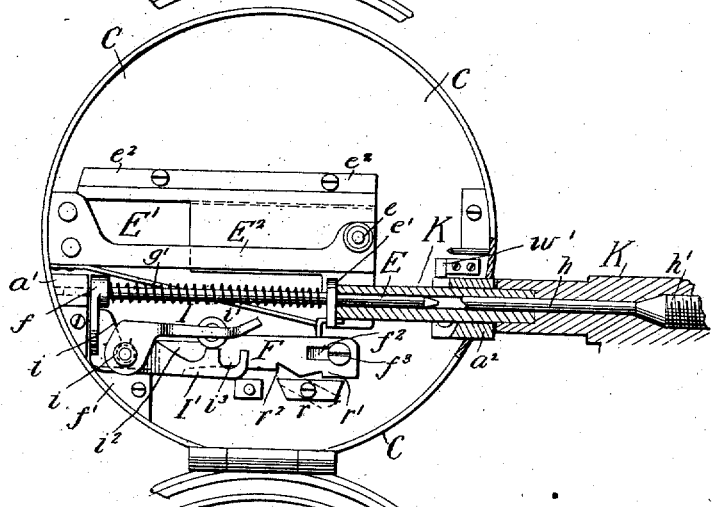
Figure 7:
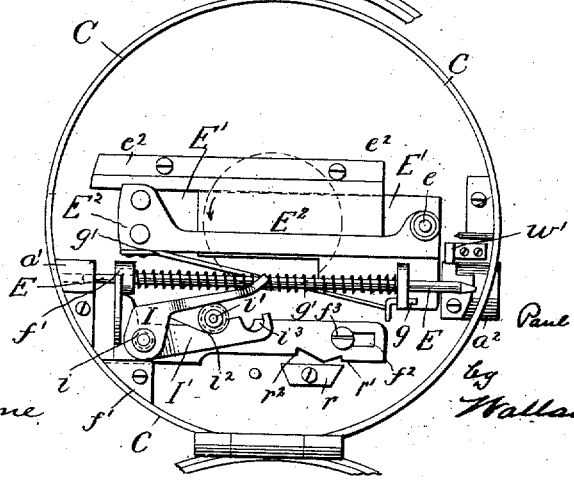
Figure 8:
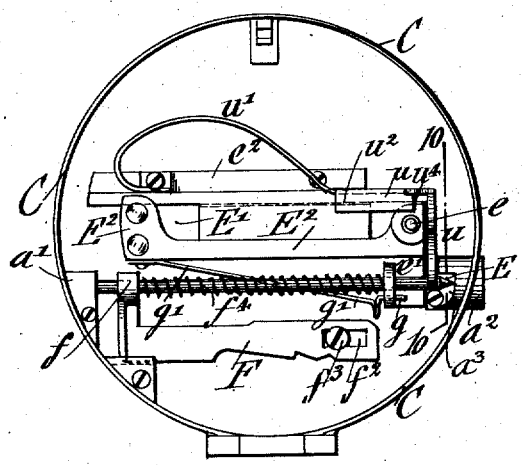
Figure 10:
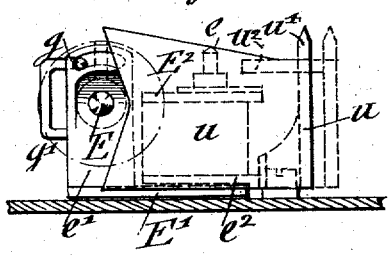
Figure 9:
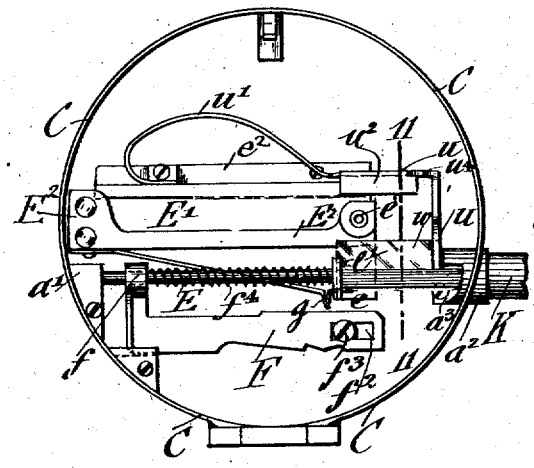
Figure 11:
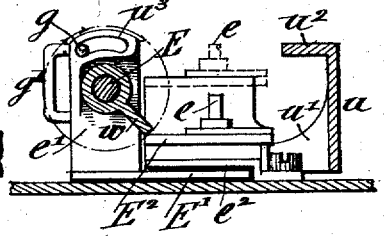

In the accompanying drawings, Figure 1 represents a plan view of my improved watchman's time-detector, showing the hinged cover of the same in open position, so as to show the marking mechanism applied to the same, the operating-key being shown in horizontal section. Fig. 2 is a similar top view of the open cover of the watchman's time-detector, showing the key inserted in the same and the marking-plate placed in the proper position for producing the marking corresponding to the key inserted. Fig. 3 is a vertical transverse section on line 3—3, Fig. 1. Fig. 4 is a detail vertical transverse section on line 4—4, Fig. 2. Figs. 5, 6, and 7 are different plan views of the cover and the marking mechanism on the same, showing it in different positions, so as to produce the different functions of the parts. Figs. 8 and 9 are top views of the cover in open position, showing an auxiliary guard device for preventing tampering with the marking device by imitation keys in normal position and when actuated by the ward of a key; and Figs. 10 and 11 are vertical transverse sections, respectively, on lines 10—10, Fig. 8, and 11—11, Fig. 9.

Similar letters of reference indicate corresponding parts.

Referring to the drawings, A represents the body of a watchman's time-detector of the well known type in which a graduated paper dial D is rotated by a clock-train mechanism located in the body A and marked from time to time by means of keys that are suspended from the different stations in the factory or other building. The paper dial D is applied to the movable top plate of the clock-train by the usual devices and the clock-train wound up before the clock or detector is handed to the watchman, a new time-disk being inserted from day to day in the usual manner.

The cover C is hinged to the main part of the time-detector and locked thereto in a suitable manner, the cover being shown in the different figures of the drawings, with the exception of Fig. 3, as being in an open position for the better description of the different operative parts arranged on the same. In Fig. 3 the cover is shown in closed position, while the main portion or body A is shown in dotted lines above the same. On the inner surface of the cover C is arranged a shiftable spindle E, which is guided at one end in a socket $a'$, that is attached to the cover at a point opposite to the key-opening $a^2$ for the marking-keys. On the spindle E is guided a bracket $e'$ of a slide-plate E′, which is guided in ways of a keeper $e^2$, attached to the under side of the cover C by suitable fastening-screws, as shown in Figs. 1, 3, and 4. To the opposite end of the side-plate E′ is riveted or otherwise attached a spring-plate $E^2$, which extends longitudinally over the slide-plate parallel with the spindle E, said spring-plate $E^2$ carrying at its opposite end a steel marker $e$, which is located adjacent to and sidewise of the tapering end of the spindle E. To the opposite shouldered end of the spindle E is applied the perforated bracket $f$ of a second slide-plate F, which is guided adjacent to the bracket $f$ along a grooved stud $f'$, located at the rim of the cover C, and at its opposite end by a slot $f^2$ on a headed pin $f^3$ on the cover C. Between the bracket $e'$ on the slide-plate E′ and the bracket $f$ on the slide-plate F is interposed on the spindle E a helical spring $f^4$ which acts on both brackets and serves when set to tension by either one to return it, with its slide-plate, into its former or normal position. The slide-plate E′ is moved inwardly against the tension of the spring $f^4$ when one of the keys at the different stations is inserted through the key-opening of the cover C and returned by the spring $f^4$ as soon as the key is withdrawn. The barrel of the key K is provided with a laterally-extending ward $w$, as shown clearly in Fig. 4, so as to permit the entry of the key-barrel and its ward into the correspondingly-shaped key-opening of the cover, which opening is surrounded by a bushing or key-box $a^2$, provided at its inner end with a recess $a^3$ in line with the spindle E. The length of the key-barrel and its ward determines the inward motion of the slide-plate E′ and marker-plate $E^2$, each key having a barrel and ward of a predetermined length, which differs from the key-barrels and wards of the remaining keys, so that the indicating-mark made by the use of each key may be identified by position on the dial. The bracket $e'$ is provided in its upper part with an arc-shaped slot $e^4$ for guiding the projecting shouldered end $g$ of a guard-spring $g'$, the opposite end of which is attached to the edge of the spring-plate $E^2$, as shown clearly in Figs. 1 and 2, said projecting end $g$ forming a guard-pin that prevents the ward of the key K to be turned in one direction—that is to say, toward the left—and necessitates thereby the turning of the key in the opposite direction—that is to say, toward the right—so that the ward $w$ engages the raised end of the marker-carrying spring-plate, depresses the same, and permits after clearing the same the release of the spring-plate, as indicated in Fig. 4, so that the marker is quickly moved by the action of its spring-plate back into its normal position and produces thereby by its sharp-pointed end the marking of the time-dial of the clock-train.

One part of my invention consists in providing a guard-device at one side of the spindle having its operative end capable of movement by the keys in respect to the spindle after a partial rotation of a key on the spindle.

The projecting end or guard-pin $g$ of the guard-spring $g'$ is normally located at the left-hand end of the slot $e^4$ and serves thereby as a guard for the proper turning of the key. When the key is turned on its axis for actuating the marker, the ward engages the projecting guard-pin, carries the same along until the key and its ward are again brought in line with the opening in the key-box, as shown in Fig. 4, in which position the projecting guard-pin arrests the ward and prevents a second turning motion of the key and the second actuation of the marker. As soon as the key is again in line with its key-opening the tension of the helical spring $f^4$ on the bracket $e'$ of the slide-plate E′ moves the key in outward direction, the parts returning from the position shown in Fig. 2 to their initial or normal position. (Shown in Fig. 1).

Another part of my invention consists in providing a movable key spindle for the engagement and non-engagement of the keys, not capable of movement by the keys, at any point of the movement of the keys.

The end of the spindle E is made tapering, the tapering end being adapted to engage the correspondingly-recessed end of a spring-cushioned spindle $h$ of a worm-shaft $h'$, that turns in suitable bearings in the casing of the key K, so that by the turning of the key in operating the marking device of the time-detector this spindle is held stationary by the spindle E, and thereby turned relatively to the key-casing, whereby motion is transmitted to a worm $h^2$ connected therewith and thence to a suitable worm-gear $h^3$, by which the key-controlling mechanism H, located in the casing of the key, is operated, a record being made of each actuation of the marking device of the time-detector by the controlling mechanism of the key K.

The improved construction of the key and the key-controlling device and the casing of the same forms the subject-matter of a separate application for Letters Patent filed upon the date of the original application.

Sidewise of the inner end of the key-box, near the rim of the cover C, is arranged a stationary stop-hook $w'$, having an inclined face, so that when the ward $w$ of the key K is inserted into the cover and turned so as to depress the spring marking-plate $E^2$ the ward passes below the hook and is prevented from turning back toward the left, as shown in dotted lines in Fig. 4, but has to be moved onward toward the right until it clears the spring-plate $E^2$ and produces the marking of the dial, while the end of the key engages the bracket $e'$ and moves the slide-plate E′ in backward direction against the tension of its helical spring $f^4$, as described. The ward $w$ of the key K, not being able to be returned toward the left owing to its engagement by the stop-hook $w'$, has to be turned toward the right until the key has completed its rotation and is moved by the action of the helical spring $f^4$ in outward direction in the key-box, the edge of the ward moving along the inclined face of the recess $a^3$ in the key-box $a^2$ until the ward is in line with the keyhole, when the spring-actuated bracket $e'$ will move the key in outward direction for its final withdrawal by the watchman.

To the slide-plate F is pivoted a lever I, to the pivot of which is applied a torsion-spring $i$, which tends to move the lever I toward and along an antifriction-roller $i'$, that is applied to a stationary pin on the cover C. To the pivot of the lever I is attached below the lever, but above the slide-plate F, a second lever-arm I′, which moves with the lever I and is provided with two recesses $i^2$ $i^3$ on the side facing the antifriction-roller, one for engaging a stationary pin $i^4$ and the other for engaging the antifriction-roller $i'$, as shown in Figs. 1 and 7. When the lower lever-arm I′ is not locked to the pin $i^4$ or to the roller $i'$, it is moved freely with the slide-plate F forward and backward toward the left, as shown in Figs. 2 and 5, so that the end of the spindle E is withdrawn into its guide-socket $a'$. The tapering end of the spindle E is thereby prevented from engaging with the spindle at the interior of the key-barrel, and consequently unable to actuate the supplemental controlling device of the key, as shown clearly in Fig. 6, for the reason that the spindle does not project far enough into the barrel of the key for engaging the end of the spindle of the controlling mechanism.

The improved key-controlling device can be automatically thrown out of action, when it is desired to do so, after a certain predetermined period of time. For this purpose the lower lever I′ is placed with its recess $i^2$ against the roller $i'$, as shown in Fig. 7, so that the upper lever I extends inwardly over the spindle E and into the path of a pin $p$, projecting from the top plate of the clock-train and passing through the time-dial, as shown in Fig. 1. This pin moves with the time-dial and engages at the proper time the end of the lever I and moves the same sufficiently so that the recessed lower-lever arm I′ clears the roller $i'$ and permits the return movement of the spindle E under the influence of its helical spring into its socket $a'$ and the motion of the slide-plate F into the position shown in Fig. 5, while the levers I, I′ are moved by the torsion-spring $i$ into the position shown in Figs. 5 and 6. In this position the spindle E is withdrawn, and will consequently not act on the controlling devices in the key until reset again. By the three positions of the lever mechanism described the spindle E may be placed in position so as to actuate the controlling devices in the keys, or the spindle E may be moved out of action, so as not to acuate the key-controlling devices, or it may be placed in such position as to be automatically released after a certain period of time. When it is desired to lock the slide-plate F permanently, so as to set the spindle-supporting bracket $f$ and the spindle E in or out of operation, a pivoted stop-piece $r$, capable of moving in one or the opposite direction, is placed into engagement with one or the other side recess $r'$ or $r^2$ in the slide-plate F, as shown in dotted lines in Figs. 1 and 6. The slide-plate F is thereby held in one case permanently in position for the actuation of the key-controlling devices, while in the other case it is held in position with the spindle E permanently out of engagement with the key-controlling devices.

On the face of the disk operated by the clock-train are arranged two pins $p$ and $p'$ intended to pierce the dials and hold them in position on the disk. A further pin $p^3$ is arranged, which is adapted to engage with the lever I at a certain time so as to actuate the lever. A fourth pin $p^2$ is arranged at a distance of about 90° from the pin $p^3$, and this pin determines the time when the lever I is to be actuated. As is well known and as is usual, the dials are provided with number-divisions corresponding to the hours.

If, for instance, it is desired that the lever I is actuated at five o'clock, then the dial is so placed on the disk as to have the pin $p^2$ pierce the dial at the five-hour mark, the distance between the pin $p^2$ and the pin $p^3$ being of such length that when the five-hour mark of the dial, or rather the pin $p^2$, arrives at the marking point, the pin $p^3$ will arrive in a position to actuate the lever I. Hence by this arrangement the time when the lever is to be actuated is fixed.

Another part of my invention consists in providing protecting means preventing the marking of the dial, until removed preparatory to the marking of the dial by the key intended to make a marking.

In Figs. 8 to 11 is shown an additional guard device which in the embodiment shown in these figures is to be used in connection with the spring-actuated bracket $e'$ on the spindle E, said guard device being intended to prevent the marking of the time-disk by the marking-point in case a spurious or imitation key is used. This guard device consists of an angular guard-plate $u$, which is attached to the free end of a curved spring $u'$, the opposite end of which is attached to the end of the guideway $e^2$ of the spring-plate $E^2$ carrying the marking-point $e$, said guard-plate extending around the marking-point, as shown in Fig. 8. The rear portion of the angular guard-plate $u$ is provided at its upper edge with a horizontal flange $u^2$, that projects over the spring-plate $E^2$, as shown in Figs. 8 and 10, while the face of the side portion of the guard-plate $u$ is obtusely recessed adjacent to the spindle E, said face being sufficiently close to the spindle to be in the path of the ward of the key when the same is inserted and turned in the key-box, as shown in dotted lines in Fig. 10. When the key is inserted in the time-detector, it forces the bracket $e'$ backward against its tension-spring $f^4$, as shown in Fig. 9, its ward on the turning of the key catching beneath the raised upper portion $u^3$ of the bracket $e'$, so as to be locked against return movement. Upon the further forward movement of the key the ward thereof in engaging the obtusely-angular recess in the guard-plate $u$ forces the same away from the spindle, and with it the flange $u^2$, so that the latter uncovers the marker-plate, which is simultaneously depressed by the ward of the key, as shown in Fig. 11. The guard-plate $u$ is moved back sufficiently that its flange $u^2$ clears the marking-point $e$, as shown in Fig. 11, and permits thereby on the release of the spring-plate the actuation of the same and the marking of the time-disk on the clock-train by the marking-point. The raise $u^3$ on the bracket $e'$ prevents the key from being turned in opposite direction when once properly inserted, and forms thereby in the same manner as the stop $w$ a means for preventing the turning of the key in the opposite direction. Whenever an imitation key, which is usually provided with a short ward, is inserted and pushed inwardly, so as to force the spring-actuated bracket $e'$ in backward direction, the ward will engage the spring-plate of the marking-point in the same manner as the genuine keys at the different stations, but it will not engage the spring-actuated guard-plate $u$ and push its flange clear of the marking-point, so that when the spring-plate is actuated it is held back by the guard-flange $u^2$ and prevented from being raised sufficiently so that the marking-point cannot mark the time-disk.

Another part of my invention consists in providing marking means so arranged whereby the use of a spurious or simulating key may be detected.

The momentum of the spring-plate $E^2$ causes the latter to produce the lifting of the flange $u^2$ of the guard-plate $u$, so that a point $u^4$, located at the upper edge of the rear portion of the same, produces a slight pricking mark on the circumference of the time-disk, indicating thereby on the inspection of the time-disk that an attempt has been made to tamper with the marking of the time-detector by an imitation key. The angular spring-actuated guard-plate forms thus a device for preventing the marking of the time-disk by the marking-point when an attempt is made to operate the time-detector by an imitation key and also indicates that an attempt was made of tampering with the time-detector by the pricking mark caused by the point $u^4$ on the guard-plate on the time-disk by the momentum imparted by the guard-plate $u$ by the spring-plate $E^2$.

By the improvements described watchmen's time-detectors of the class referred to are rendered more accurate and reliable, mainly for the reason that the tampering with the detector by spurious or imitation keys is absolutely prevented, as the key when once inserted into the cover of the time-detector is fully controlled throughout its motion in the same and ejected from the time-detector when the full rotation required for the actuation of the marking-point is completed. The different guard and safety devices described overcome thereby some of the well-founded objections to this class of time-detectors, render them more reliable, and permit them to be adjusted so as to operate the auxiliary key-controllers or discontinue the operation of the same or operate the same for a predetermined period of time and discontinue them automatically by the action of the clock-train at the will of the owner of the buildings to be watched.

Certain novel features have been described in the foregoing specification, these novel features being shown as one embodiment of my invention. These features, may, however, be used with and applied to watchman's clocks other than the type shown. Fundamentally, as stated, these novel features consist of: 1. The movable key spindle for the engagement and non-engagement of the keys, not capable of movement by the keys, at any point of the movement of the keys. 2. The marking means separate from the usual marking means adapted to mark the dial on the operation of any but the true key. 3. The guard device arranged at one side of the spindle, having its operative end capable of movement by the keys in respect to the spindle after a partial rotation of a key on the spindle. 4. The protecting means normally preventing the marking of the dial until removed preparatory to the marking of the dial by the key intended to make the marking. I have shown a practical embodiment of these fundamental features, and since it is very evident that such embodiment might be varied without departing from the spirit of my invention, I do not wish to limit myself to such detailed characteristics necessary for a full disclosure and understanding of my invention.

Having thus described my invention, I claim as new and desire to secure by Letters Patent:

1. In a watchman's time detector, the combination of a spindle, a support with guide-slot in the same, and a guard-device movable therein.

2. In a watchman's time-detector having keys and a spindle therefor, a guard-device arranged at one side of the spindle, having its operative end capable of movement by the keys in respect to the spindle after a partial rotation of a key on the spindle.

3. In a watchman's time detector having keys with wards, the combination of a spindle for the keys and a spring-actuated guard-device in the path of the ward of each key, movable with the ward of the key during a period of its rotation in one direction, and adapted to prevent further movement of the ward in that direction at the end of that period.

4. In a watchman's time detector having keys and a marking device coöperating to make a marking, means arranged preventing, without withdrawing the key, more than one rotation of a key in one direction, and thus more than one marking, said means permitting the withdrawal of the key at the end of its rotation.

5. In a watchman's time detector having keys, the combination of a spindle for the keys, movable in a direction opposite to that of a key during its insertion; means securing the spindle in position; and means causing the return of the spindle to its initial position on the release of the securing means.

6. In a watchman's time detector, the combination of a movable spindle, means for locking the spindle in position; and means releasing said locking means.

7. In a watchman's time detector having keys, the combination of a movable spindle, and means for locking the spindle in a previously determined position.

8. In a watchman's time detector having keys, a movable key-spindle, but not capable of movement by the keys at any point of the movement of the keys.

9. In a watchman's portable time-detector, the combination of a movable key, and a spindle in the detector for the key, capable of movement in respect to the key, but not movable by it.

10. In a watchman's time detector having a dial moved by a clock train, the combination of a spindle, a mechanism connected therewith for holding it in a certain position, and a pin on the dial of the clock train adapted to engage the mechanism and release it.

11. In a watchman's time detector, the combination of a spring-actuated movable spindle, a plate movable therewith having a recess, and a stop device adapted to engage the recess for holding the spindle in one position, the spindle returning to its initial position on the disengagement of the recess with the stop device.

12. In a watchman's time detector, the combination of a spindle, mechanism for securing it in position, mechanism for releasing said securing means, and means indicating the time when the releasing mechanism was actuated.

13. In a portable watchman's time-detector having a marking device and keys therefor, means normally in the way of the marking device, shiftable by the key intended to engage the marking device so as to permit the making of a marking by said key.

14. In a watchman's time-detector having a marking device and keys therefor, a spring-actuated guard device extending over the marking device and adapted to be shifted away from the same by the key intended to make a marking so as to permit a marking by the key.

15. In a watchman's time detector having a spring-actuated marking plate, a guard-device having one part extending over the marking plate and having a marking point, adapted to be shifted away from the marking plate and permit its free action.

16. In a watchman's time-detector having a marking device having a stationary marking plate and keys therefor; means preventing the marking separate from the marking device and transverse to the point to be marked and operative by means of the key intended to engage the marking device so as to make a marking.

17. In a watchman's time-detector, marking means, and means separate from the marking means adapted to mark the dial on the operation of any but the true key.

18. In a watchman's time-detector having keys, a marking device operated by a proper key, and a marking device other than the first marking device not operated for marking by that key, but by a key other than a proper one.

19. In a watchman's time-detector, the combination of a slidable spring-actuated slide-plate carrying a bracket, a key-receiving spindle guided in said bracket, a movable guard device projecting through the spindle-bracket and adapted to be moved by the key and to limit the rotation of the same, and means for returning the guard device to its original position after the key is withdrawn.

20. In a watchman's time-detector, the combination of a spring-actuated slide-plate guided in the cover of the detector, and carrying a bracket having a perforation and a slot, a key-receiving spindle supported at its forward end in said perforation, means for supporting the rear end of the spindle, a spring marking plate carried by the slide-plate and adapted to be operated by the key, a guard device projecting through said slot and adapted to be moved by the key and to limit the rotation of the same, and means to return the guard device to its normal position after the key is removed.

21. In a watchman's clock, the combination of a slide-plate having a perforated bracket, a second slide-plate also carrying a perforated bracket, a key-receiving spindle received in the perforations of said brackets, a marking device carried by the first slide-plate and adapted to be operated by the key, a spiral spring on said spindle between and bearing against said brackets, and releasable mechanism for locking the second guide-plate in predetermined position.

22. In a watchman's clock, the combination of a slide-plate having a perforated bracket, a second slide-plate also carrying a perforated bracket, a key-receiving spindle received in the perforations of said brackets, a marking device carried by the first slide-plate and adapted to be operated by the key, a spiral spring on said spindle between and bearing against said brackets, releasable mechanism for locking the second guide-plate in predetermined position, and means for automatically releasing said mechanism.

23. In a watchman's clock, the combination of a slide-plate guided in the cover of the clock and carrying a bracket with a perforation therein, a second slide-plate also guided in the cover and having a bracket with a perforation therein, a key-receiving spindle carried in said perforations, a helical spring on said spindle bearing between said brackets, a spring-pressed locking lever fastened to the second slide-plate, said locking lever having recesses at its outer end, a stationary pin adapted to be engaged by one of said recesses, and a roller on the cover adapted to be engaged by the other of said recesses.

24. In a watchman's clock, the combination of a slide-plate guided in the cover of the clock and carrying a bracket with a perforation therein, a second slide-plate also guided in the cover and having a bracket with a perforation therein, a key-receiving spindle carried in said perforations, a spring-pressed locking lever fastened to the second slide-plate, and a pin carried by the dial of the clock for moving said locking lever.

25. In a watchman's clock, the combination of the key-receiving spindle, means for moving said spindle longitudinally toward its key-receiving end, locking means for holding the spindle in a predetermined position, means for releasing the locking means, and means for returning the spindle to its normal position.

26. In a watchman's clock, the combination of a key-operated marking plate, a guard device normally extending over the marking plate, and means carried by the guard device adapted to be operated by a key to move said guard device away from over said marking plate.

27. In a watchman's clock, the combination of a spring-actuated key-operated marking plate, a spring-carried guard-plate normally extending over said marking plate and carrying a marking device, and means carried by said guard-plate and adapted to be engaged by a true key whereby said guard-plate is moved away from over said marking plate.

28. In a watchman's time-detector having a stationary marking plate and a marker; a member separate from the plate having one part normally in the path of the marker to prevent a marking, and another part engageable by a key for moving the first part out of the path of the marker to enable the key to complete its function in bringing about a marking.

29. In a watchman's time-detector, the combination of a key, a stationary marking plate, a marking point movable by said key to coöperate with said plate to make a marking, and a preventing means separate from said plate and normally preventing the making of a marking by said point, but shiftable by said key to a position which will permit of the making of a marking by the point.

30. In a watchman's time-detector, the combination of a stationary marking plate, a spindle, a key rotatable upon said spindle, means interposed between the key and the stationary marking plate whereby rotation of said key may cause the making of a marking, and a preventing means separate from venting the making of a marking but shiftable by the rotation of the key whereby, on the rotation of the key, a marking is permitted to be made.

PAUL MOOSMANN.

Witnesses:
WALLACE GREENE,
C. P. GOEPEL.